United States Patent Office 3,210,272
Patented Oct. 5, 1965

3,210,272
METHOD OF DRYING PARTICULATE SOLIDS
Gerald L. Foster and Alfred R. Hendrickson, Tulsa, Okla., assignors to The Dow Chemical Company, Midland, Mich., a corporation of Delaware
No Drawing. Filed Apr. 25, 1963, Ser. No. 275,514
6 Claims. (Cl. 210—39)

The invention relates to an improved method of removing liquids entrapped in, adhering to, or otherwise associated with particulate solids.

An important step in many processes of manufacture or production of particulate material is the removal of liquids therefrom. Illustrative of such processes are the removal of liquid reaction medium, carrier liquid, or wash liquid from polymers.

The separation of liquids associated with polymers has been an especially difficult step in many instances. The use of known techniques, e.g., filtration, has not been satisfactory because the filter is often badly plugged even in the early stages of the process. This is especially true where the polymer is composed of a wide range of sizes because a sort of packing of the particles occurs.

A need exists for an improved method of separating liquid from polymeric solids which are in intimate association therewith, including both adsorbed and absorbed liquid.

The invention meets this need. It provides a method of effecting such separation which is efficient and economical. How the invention meets this need is explained in the ensuing description and is succinctly defined in the appended claims.

The invention, accordingly, is a method of removing liquid from particulate solids with which they are in intimate association which comprises: admixing with said intimate association of solids and liquid an adsorbent or absorbent granular material, of low liquid content, having a particulate size differentiation from that of the solids in said intimate association of at least one standard sieve mesh size and preferably a differentiation of two or more mesh sizes. The standard sieve mesh size to which reference is made is that of the U.S. Sieve Series, U.S. Bureau of Standards, Standard Screen Series.

The adsorbent or absorbent granular material will be referred to hereinafter, generically, as sorbent material and will include both adsorbency and absorbency. Best results are obtained when the sorbent material employed is of a substantially larger particle size than that of the particulate solids from which the liquid is to be removed. The sorbent material must be adsorbent or absorbent, that is, have an attraction of a cohesive or capillary type, for the liquid sought to be removed. Sorbent materials having a high surface area per unit of weight are preferred. The choice of sorbent material will depend largely upon the nature of the liquid to be removed. For satisfactory performance, it is a requisite that the sorbent material employed must be of such nature that the liquid sought to be removed has a greater attraction for it than for the solids sought to be dried. Any organic or inorganic particulate material having the proper sorbency of the liquid from the intimate association of particulate solids and liquid may be employed. Among such materials are powdered charcoal, coke, expanded graphite of suitable strength, and vermiculite; rock, brick, cement, pumice, and ceramic dust; powdered silica and silica gels; clays, fuller's earth, and admixtures thereof; selected sulfates and oxides, e.g., $BaSO_4$ and $TiO_2$; and mixtures of such sorbent materials. A particularly effective sorbent material for use in removing organic solvents from polymeric materials is fuller's earth.

Among the particulate solids from which liquids may be removed according to the invention are such polymers as polyacrylamide, polyglycol toluene diisocyanate, polystyrene, and copolymers thereof.

The amount of sorbent granular material to employ in the practice of the invention is that which is sufficient to sorb substantially all the liquid from the solids from which the liquid is to be removed. The amount of the sorbent material to employ for removal of the liquid from the particulate solids is usually between about 0.2 and 2.0 parts, and preferably between about .5 and 1.0 part, per part by weight of the sorbent material added. The greater the surface area per unit of weight of the sorbent material, the more effective is any given amount thereof when employed in treating the same liquid particulate solid in intimate association.

The following example is illustrative of the practice of the invention.

A cross-linked polyglycol-tolylene diisocyanate polymer and kerosene were intimately associated in equal amounts by weight of each. This polymer had been prepared as follows: 100 parts by weight of polyoxypropylene glycol of a molecular weight on the order of 20,000 and containing about 500 parts per million of sodium as sodium acetate were mixed with about 100 parts by weight of kerosene in a moisture-free reaction vessel equipped with stirring and heating facilities. The mixture was heated to remove any water present. Following this, about 1.3 parts by weight of tolylene diisocyanate were added to the reaction mixture and the temperature brought to about 80° C. and held there for 1.5 hours; another 1.3 parts of tolylene diisocyanate were then added to the reaction mixture which continued to be maintained at about 80° C. for a second period of about 1.5 hours. At this time, acetic anhydride was added in a mole to mole ratio based on the tolylene diisocyanate present and the temperature continued at 80° C. for an additional 0.5 hour. A liquid cross-linked polyurethane polymer was thus produced.

It is desired to remove the kerosene from the thus prepared polymer in accordance with the invention. The mesh size of the polymer so produced was smaller than that which would pass through a 20 mesh sieve and approximately 20% thereof would pass through a 100 mesh sieve.

To 6000 pounds of the intimate association of kerosene and polymer (a volume of about 720 gallons) in a suitable vessel provided with a stirring means, there were admixed 6000 pounds of fuller's earth of a particle size such that it would pass through a 10 mesh sieve but be retained on a 20 mesh sieve. The contents of the vessel were stirred for 20 minutes to provide a substantially uniform mixture thereof. Upon visual inspection all the kerosene appeared to be sorbed by the fuller's earth. Thereafter the resulting mixture of polymer and fuller's earth having the kerosene sorbed thereinto or thereto was subjected to the sieving action of a 20 mesh sieve. The polymer passed through the sieve whereas the fuller's earth, containing substantially all the kerosene originally present in intimate association with the polymer, remained on the sieve. Examination of the polymer showed that it was substantially free of kerosene. The polymer thus recovered weighed about 3000 pounds, i.e., substantially all the polymer originally present in the kerosene polymer slurry was recovered.

The fuller's earth, containing the thus removed kerosene may, if desired, be dried, to remove the kerosene, but it is recommended that it be employed as fuel whereby the burning of the kerosene provides a source of heat, leaving the fuller's earth which may conveniently and economically be reused as a sorbent in accordance with the invention.

Reference to the above example shows that the invention is highly useful for the separation of a liquid which is intimately associated with particulate solids of the nature of a slurry of an organic liquid reaction medium and a particulate solid polymer therein.

The above example is set forth for illustrative purposes only. It is to be understood that other particulate solids intimately associated with liquids sought to be removed therefrom may be treated in accordance with the invention by admixing with such intimate association a sorbent particulate material having a different particle size than the solids comprising the intimate association.

Having described the invention what we claim and desire to protect by Letters Patent is:

1. A method of removing a liquid from particulate solids with which it is in intimate association which comprises: admixing with the intimate association of liquid and solids a sorbent granular material having greater sorbency for the liquid present in said intimate association than do the particulate solids and which is substantially free of liquid, in an amount sufficient to absorb and adsorb substantially all of the liquid present in said intimate association, and having a particle size differentiation from that of the particulate solids present in said intimate association of at least about 1 sieve mesh size, according to the United States Bureau of Standards Sieve Series; agitating the resulting mixture until said sorbent material has come in contact with substantially all the liquid present; and separating the sorbent material together with the liquid absorbed and adsorbed thereon and therein from the particulate solids of said intimate association.

2. The method according to claim 1 wherein said intimate association is a slurry comprising a liquid medium and a polymer.

3. The method according to claim 2 wherein said polymer is a cross-linked polyglycol-tolylene diisocyanate polymer and the liquid is an organic reaction medium employed in the preparation of the polymer.

4. The method according to claim 3 wherein the sorbent material employed is fuller's earth.

5. The method according to claim 4 wherein the weight ratio of the fuller's earth employed to the liquid medium in said intimate association is between about 0.2 and 2.

6. The method according to claim 1 wherein said sorbent granular material admixed with said particulate solid and liquid in intimate association therewith which is sought to be removed, is selected from the class consisting of pulverized charcoal, coke, expanded graphite, vermiculite, rock, brick, cement, pumice, ceramics, silica and silica gels, clays, fuller's earth, sulfates and oxides, and mixtures thereof.

References Cited by the Examiner
UNITED STATES PATENTS

| | | | |
|---|---|---|---|
| 2,696,305 | 12/54 | Slover | 260—708 |
| 2,696,462 | 12/54 | Bodkin | 260—708 |
| 2,929,800 | 3/60 | Hill. | |

MORRIS O. WOLK, *Primary Examiner.*